No Printed Specification Available
9143X
A. Wolcott
Alcohol Still.
Patented Oct. 6, 1835.
NO PRINTED COPY OF SPECIFICATION IN OFFICE.
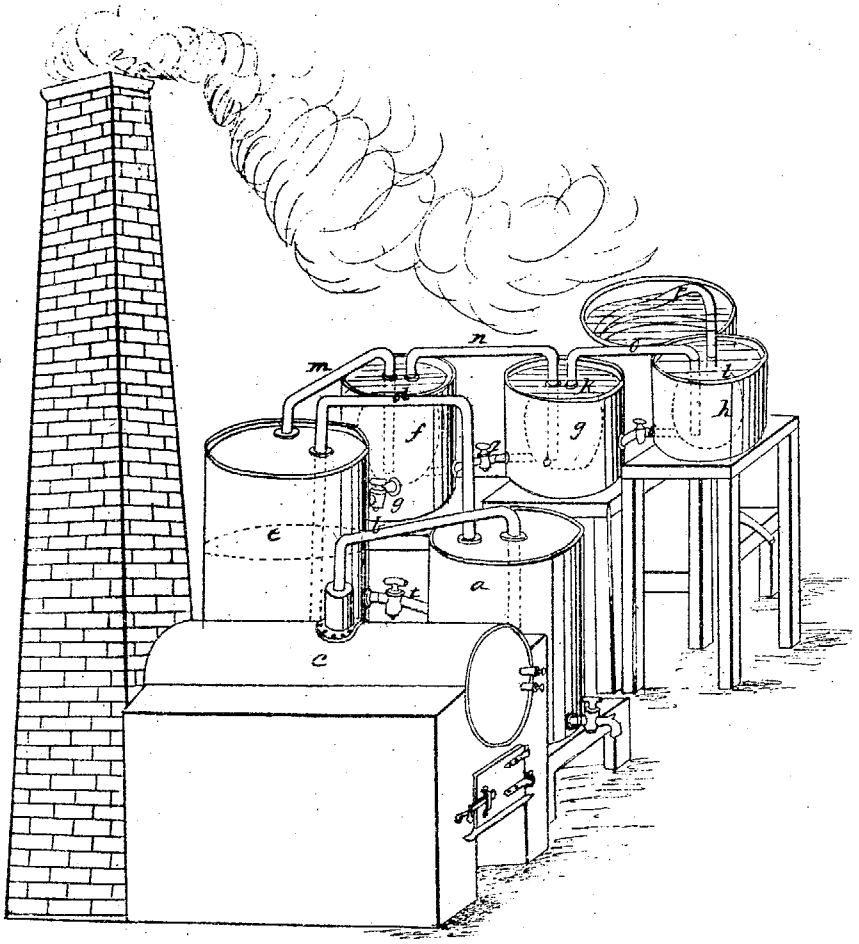

Oct. 6. 1835 1. 369

Anson Wolcott
9143X Letters Patent

The Schedule referred to in these Letters Patent and making part of the same containing a description in the words of the said Anson Wolcott himself of his improvement in the art of extracting Alcohol from Apples

---

To all to whom these Presents shall come:

Be it known that I Anson Wolcott of the Town of East Bloomfield in the County of Ontario and State of New York have invented a new and useful improvement in the art of extracting Alcohol from apples and the following is a full and exact description thereof. Put the Apples after being finely ground and fermented into a steam-tight tub (about half full) from a steam generator, the steam is conducted through a pipe passing through the top and down to the bottom of the tub. From this first tub the steam is conducted through a pipe passing through the top and down to the bottom of the second steam-tight tub, standing higher than the first tub and about half full of water or spirits. Place three open tubs filled with water in any situation most convenient for the distiller and standing higher than the second tub, in each of the three open tubs place a globular Metallic condenser, from the second steam-tight tub conduct the steam through a pipe leading over the top of the first open tub through the top and down to the bottom of the condenser. From this first condenser conduct the steam over the top of the second open tube and down to the bottom of the second condenser, from the second condenser, conduct the steam over the top of the third open tube and down to the bottom of the third condenser, from the third condenser conduct the steam over the top of the third tub into the still-worms. The water in the open tubs must be kept hot enough to carry the Alcohol forward through the condensers into the still-worms. The water which is made by steam in the condensers, returns through pipes leading from the condensers through the side 370. 9143X side of the tubs into the second steam tight tub (and from the second steam tight tub through the sides into the first steam tight tub.

What I claim as my own invention in the above specification (as not previously known) is the application of steam in extracting Alco hol from Apple pomase without first making it into cider, and the globular metallic condenser

Anson Wolcott

Exd. Witnesses
W.J.C. Simeon Deming
William Deming

42 [illegible]